United States Patent
Shimizu et al.

(10) Patent No.: US 12,165,385 B2
(45) Date of Patent: Dec. 10, 2024

(54) INFORMATION PROCESSING APPARATUS, CLASS DETERMINATION METHOD, STORAGE MEDIUM

(71) Applicant: CANON KABUSHIKI KAISHA, Tokyo (JP)

(72) Inventors: Tomoyuki Shimizu, Kanagawa (JP); Atsushi Nogami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 17/840,391

(22) Filed: Jun. 14, 2022

(65) Prior Publication Data

US 2022/0398828 A1 Dec. 15, 2022

(30) Foreign Application Priority Data

Jun. 15, 2021 (JP) .................. 2021-099454

(51) Int. Cl.
*G06V 10/764* (2022.01)
*G06V 10/774* (2022.01)

(52) U.S. Cl.
CPC .......... *G06V 10/764* (2022.01); *G06V 10/774* (2022.01)

(58) Field of Classification Search
CPC .... G06V 10/764; G06V 10/774; G06V 20/52; G06V 10/82
See application file for complete search history.

(56) References Cited

U.S. PATENT DOCUMENTS 11,270,001 B2 * 3/2022 Shibahara ............. G06F 21/552

FOREIGN PATENT DOCUMENTS

JP 2019175015 A 10/2019

\* cited by examiner

*Primary Examiner* — Christopher M Brandt
(74) *Attorney, Agent, or Firm* — Canon U.S.A., Inc. IP Division

(57) ABSTRACT

An information processing apparatus includes an acquisition unit configured to acquire the number of training images including an object belonging to one of a plurality of classes having an order relation, the acquisition unit acquiring the number of training images for each of the plurality of classes, a first determination unit configured to determine, as a combination target class to be combined, a class with the number of training images that is smaller than a threshold value among the plurality of classes, a combination unit configured to combine the combination target class with an adjacent class in the order relation, and a second determination unit configured to determine a class of an object included in an input image using a determiner trained using the training image based on a combination class combined by the combination unit.

12 Claims, 17 Drawing Sheets

FIG.4

| S | A | B | C | D |
|---|---|---|---|---|
| 10 | 70 | 100 | 150 | 110 |

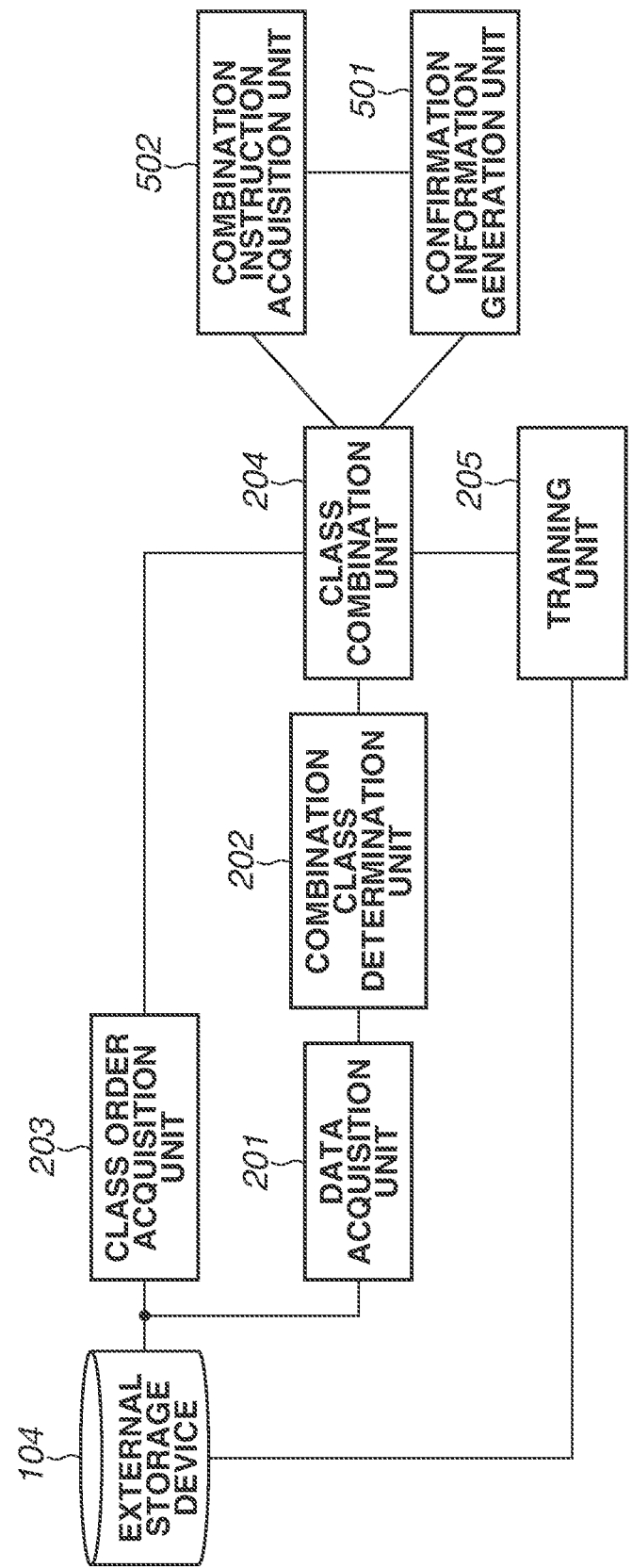

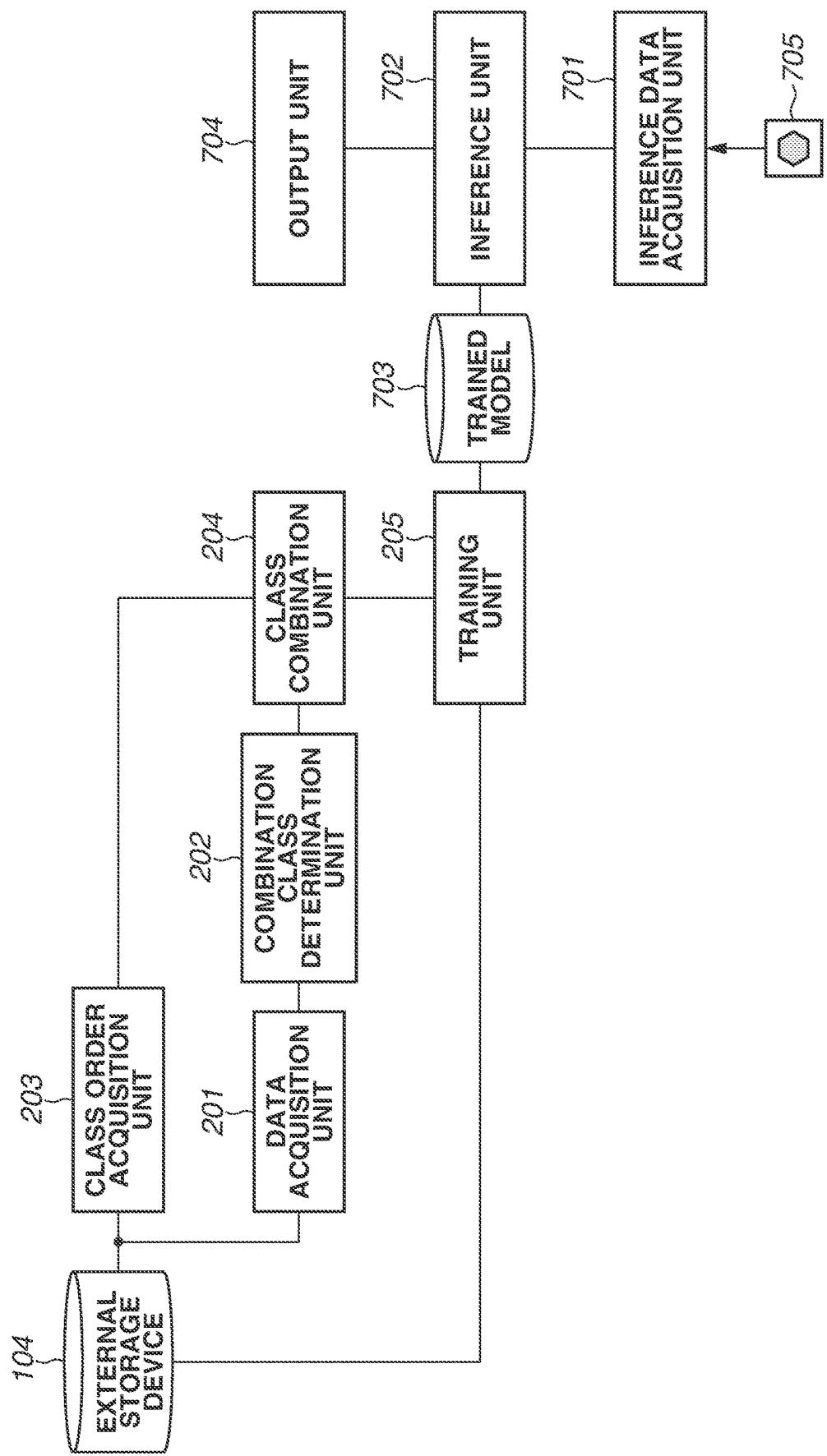

FIG.14

| | 1401 | | | | | | | |
|---|---|---|---|---|---|---|---|---|
| S | S, A | A | A, B | B | B, C | C | C, D | D |
| 5 | 35 | 50 | 40 | 50 | 60 | 50 | 20 | 50 |
| | 1402 | | 1403 | | 1404 | | 1405 | |

INFORMATION PROCESSING APPARATUS, CLASS DETERMINATION METHOD, STORAGE MEDIUM

BACKGROUND

Field of the Disclosure

The present disclosure relates to a method for classifying images into classes.

Description of the Related Art

There are recent image processing technologies available for determining types and categories of objects in images with great accuracy by training (optimizing) parameters of a multi-layer convolutional neural network (hereinafter, referred to as "CNN") using a large amount of correct-answer image data. It is known that sufficient development of training leads to a determination accuracy that the human cannot do, and image processing technologies that relate to class determination through training are widely spreading over various fields using images. For example, there have been considered applications of the image processing technologies to various fields including maintenance and inspection of social infrastructures and medical fields. Inspection of social infrastructures could involve capturing images of structures such as bridges and tunnels and various parts of the structures and then applying the above-described image processing to the images to determine damage levels. Japanese Patent Application Laid-Open No. 2019-175015 discusses a method of outputting damage levels of damaged buildings based on acquired images and a trained model for damage level determination that is trained in advance using training images of the damaged buildings and training data indicating damage levels of the buildings.

Training images corresponding to various states (hereinafter, referred to as "classes") are necessary for training a determiner for determining deterioration and damage levels of structures or a determiner for determining development levels of diseases through image inspections such as X-ray examinations. Further, training a determiner for performing class determination with great accuracy in any states entails using a sufficient number of training images in each state. However, images of classes corresponding to abnormal states are more difficult to obtain than normal images, and there can be a class with an insufficient number of training images. A determiner trained with an insufficient training images for one or some classes can fail to perform correct classification.

SUMMARY

The present disclosure is directed to reducing erroneous classification results even in a case where there is a class with an insufficient training images acquired.

According to an aspect of the present disclosure, an information processing apparatus includes an acquisition unit configured to acquire the number of training images including an object belonging to one of a plurality of classes having an order relation, the acquisition unit acquiring the number of training images for each of the plurality of classes, a first determination unit configured to determine, as a combination target class to be combined, a class with the number of training images that is smaller than a threshold value among the plurality of classes, a combination unit configured to combine the combination target class with an adjacent class in the order relation, and a second determination unit configured to determine a class of an object included in an input image using a determiner trained using the training image based on a combination class combined by the combination unit.

Further features of the present disclosure will become apparent from the following description of exemplary embodiments with reference to the attached drawings.

BRIEF DESCRIPTION OF THE DRAWINGS

FIG. 4 illustrates an example of a distribution of the number of pieces of training data for each class according to one or more aspects of the present disclosure.

FIG. 5 is a block diagram illustrating a configuration of presenting a combination class confirmation display and receiving an instruction as to whether to proceed with the combination from a user according to one or more aspects of the present disclosure.

FIG. 7 is a block diagram illustrating a configuration of presenting a result of inference performed using a model trained using a combination class to a user and prompting the user to confirm a class in a case where the inference result is a combination class according to one or more aspects of the present disclosure.

FIG. 14 is a diagram illustrating an example of a distribution of the number of pieces of data including class settings in a case where which one of two adjacent classes a target corresponds to cannot be determined according to one or more aspects of the present disclosure.

DESCRIPTION OF THE EMBODIMENTS

Some exemplary embodiments of the present disclosure will be described below with reference to the attached drawings. The exemplary embodiments merely illustrate an example of specific implementation of the present disclosure and are a specific exemplary embodiment of a configuration defined in the claims.

The configuration of a class determination apparatus 100 as an information processing apparatus that carries out a class determination method according to a first exemplary embodiment will be described below with reference to a block diagram in FIG. 1. The class determination apparatus 100 can be configured with a single computer apparatus or functions distributed to a plurality of computer apparatuses as appropriate. In the class determination apparatus 100 configured with a plurality of computer apparatuses, the plurality of computer apparatuses is connected together via a local area network (LAN) to communicate with one another.

Figure 1:
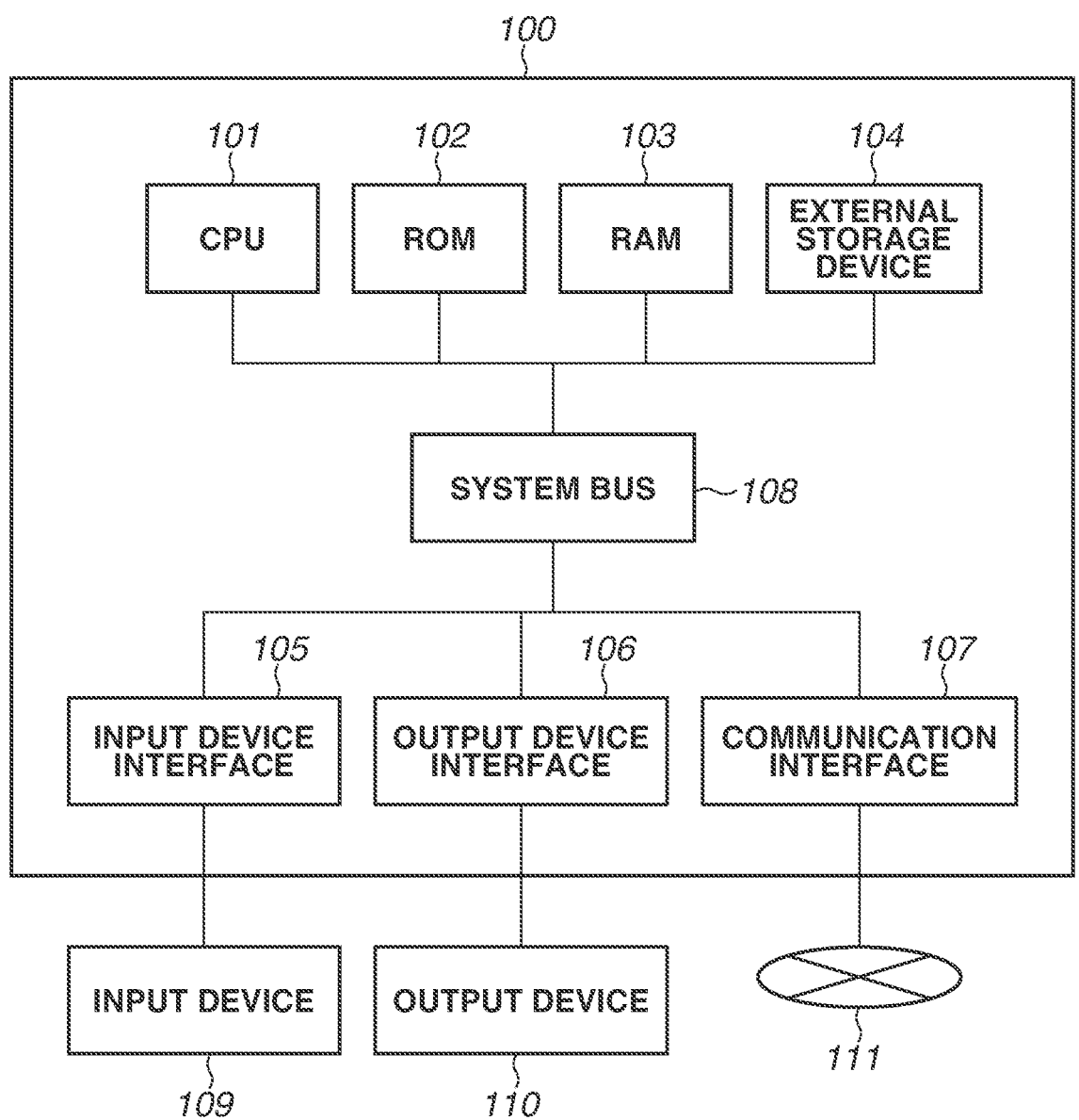
FIG. 1 is a block diagram illustrating a circuit configuration of a class determination apparatus according to one or more aspects of the present disclosure.

In FIG. 1, a central processing unit (CPU) 101 performs the general control of the class determination apparatus 100. A read-only memory (ROM) 102 stores programs and parameters that are not to be changed. A random access memory (RAM) 103 temporarily stores programs and data fed from external apparatuses. A program stored in the ROM 102 is loaded to the RAM 103, and the CPU 101 runs the program to control hardware, compute information, and process information, whereby a process illustrated in a flowchart described below is carried out.

An external storage device 104 is a hard disk or a memory card fixed to the class determination apparatus 100. The external storage device 104 can be a storage device including a removable flexible disk (removable FD), an optical disk such as a compact disk (CD), a magnetic or optical card, an integrated circuit (IC) card, and a memory card. According to the present exemplary embodiment, training image data, data on classes associated with training images, class order relation information, inference target image data, and trained models are stored.

An input device interface 105 is an interface with an input device 109 such as a pointing device and a keyboard. The input device 109 inputs data based on received user operations, An output device interface 106 is an interface with an output device 110 such as a monitor. The output device 110 outputs data stored in the class determination apparatus 100, fed data, and program execution results.

A communication interface 107 is a communication interface such as a wide area network (WAN) or a LAN tor connecting to a network 111. According to the present exemplary embodiment, a connection can be established with another computer apparatus via a WAN or a LAN to transmit and receive processing results, display content, and user instructions. A system bus 108 communicably connects the units 101 to 107 together.

In the present exemplary embodiment, the following is a description on the assumption that a class determiner is trained using the training data with a class label added to a training image captured by a user, as training data. A possible business form is that, for example, the training data is received via a terminal of the user and a network, the determiner is trained using the received training data, and an inference unit provides an inference service, Images captured in advance by the user are stored in the external storage device 104 in generating training data.

A case where damage levels of determination targets that are parts (such as bolts) of structures such as bridges and tunnels are classified into classes according to the present exemplary embodiment will be described below as an example. Determination targets are not limited to those described above and can be persons or objects, and the present exemplary embodiment is applicable to the classification according to facial expression or age of persons and to the classification according to attributes of objects.

Figure 16:
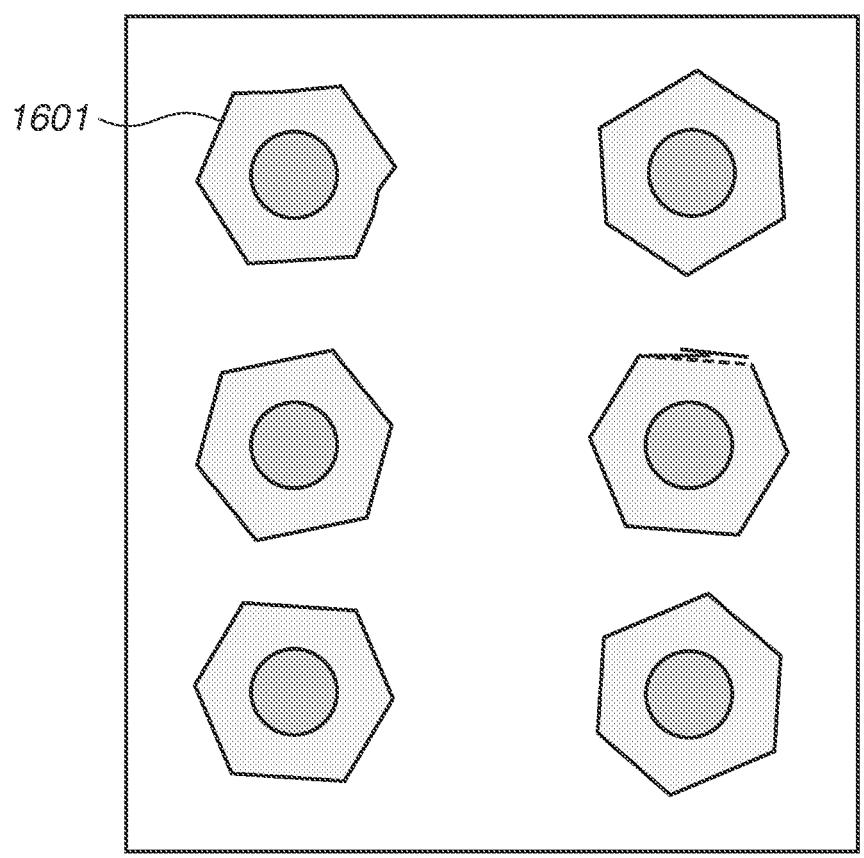
FIG. 16 is a diagram illustrating an example of an image captured to include determination targets according to one or more aspects of the present disclosure.

FIG. 16 illustrates an example of a captured image of a portion of a wall surface including parts. Images of an entire wall surface of a structure are captured while an image capturing range is shifted little by little to cover inspection target parts. Thus, a large number of images similar to FIG. 16 are captured.

Figure 17:
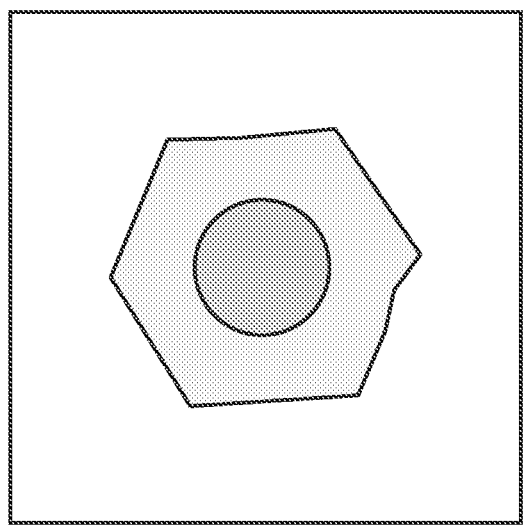
FIG. 17 is a diagram illustrating an example of an image of a determination target that is adjusted in position and size and then cut according to one or more aspects of the present disclosure.

According to the present exemplary embodiment, an image of each determination target is cut from the captured images similar to FIG. 16. FIG. 17 illustrates an example of a cut image of a bolt 1601 included in FIG. 16. As illustrated in FIG. 17, each determination target is adjusted to be substantially at the center of an image to be cut, and then the images of the determination targets are cut so that the determination targets in the cut images are substantially equal in size. In general, use of input images normalized in position and size as described above is known to increase the accuracy of determination by image processing. Thus, according to the present exemplary embodiment, images are cut in advance, and the cut images are sequentially stored as input images of the determiner and are managed in the external storage device 104. The cutting of determination targets from images can be performed by the class determination apparatus 100 based on image recognition or based on user operations.

Further, as for training images, a damage level indicating a level of damage as a class of each part is predetermined for each determination target in FIG. 17, and the determined damage levels are stored in association with the corresponding determination targets in the external storage device 104.

According to the present exemplary embodiment, damage levels are determined in five classes of S, A, B, C, and D. The S-class corresponds to the highest damage level and indicates that the part is deteriorated/broken to the most developed state. The damage levels indicated by the A-, B-, C-, and D-classes decrease in this order. Further, the definition of an order relation of the classes of the damage levels described above is also stored. The five classes are a mere example, and the classification into classes can be performed by any granularity levels.

An example of training the determiner while acquiring the various data stored as described above will be described below.

Images of determination targets are not limited to those described above and can be any images that are to be classified by classes having an order relation. Examples include the determination of ranks of agricultural products and the determination of lesions in medical images.

Figure 2:
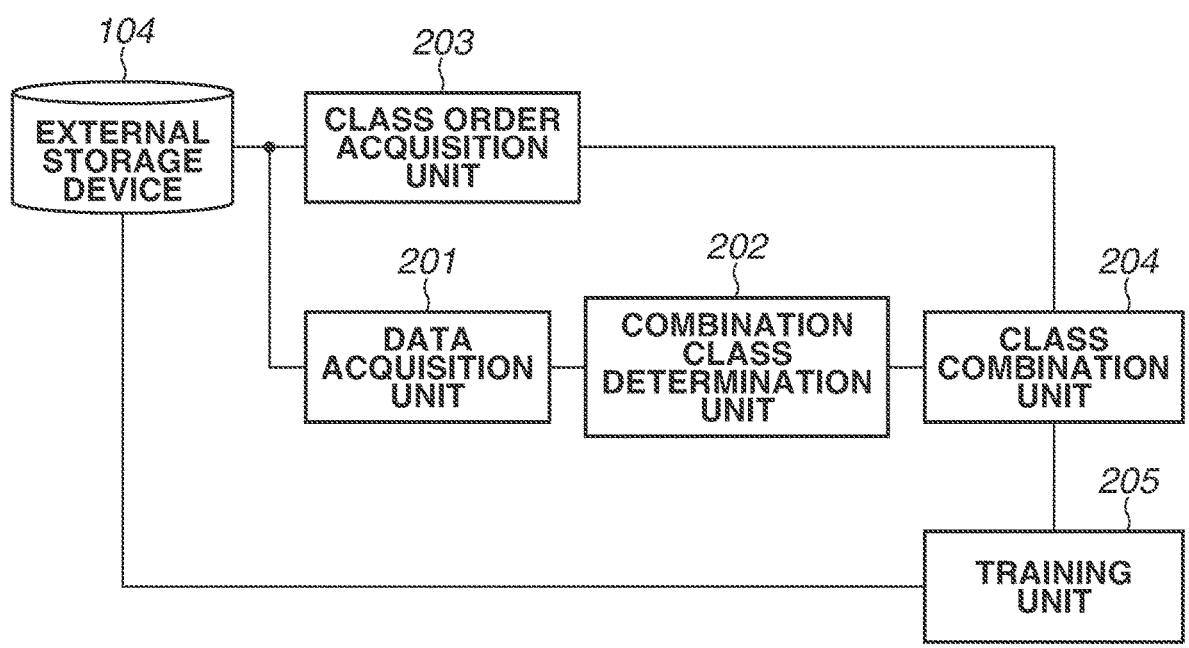
FIG. 2 is a block diagram illustrating a functional configuration of the class determination apparatus according to one or more aspects of the present disclosure.

Next, a functional configuration of the class determination apparatus 100 according to the present exemplary embodiment will be described below with reference to a block diagram in FIG. 2. A program stored in the ROM 102 is loaded to the RAM 103, and the CPU 101 runs the program to control hardware, compute information, and process information, whereby the functional blocks illustrated in FIG. 2 are implemented. In some embodiments, the functional blocks are implemented by hardware such as an application-specific integrated circuit (ASIC).

Figure 4:
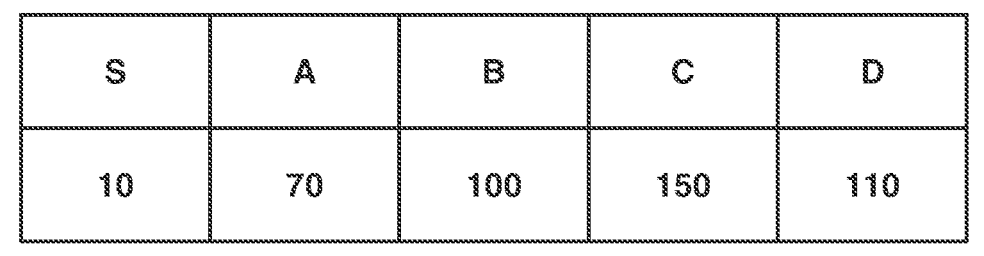

A data acquisition unit 201 acquires data on all damage levels of training data. The data acquisition unit 201 acquires distribution information about each damage level as illustrated in a table in FIG. 4 by way of example. FIG. 4 illustrates an example of a table showing a distribution of the number of pieces of training data for each class. In this example, ten S-class images of the highest damage level are acquired. In general, it is hard to acquire samples of classes indicating an abnormality compared to other classes. This example is a typical case illustrating such a situation.

A combination class determination unit 202 determines classes of damage levels of combination targets. According to the present exemplary embodiment, each class determined as a combination target class to be combined by the combination class determination unit 202 is a class with the number of samples that is smaller than a predetermined threshold value. For example, if the threshold value for the number of samples is 50 for the samples illustrated in FIG. 4, the S-class with the number of samples that is smaller than the threshold value is determined as a combination target.

A class order acquisition unit 203 acquires an order relation between the classes. According to the present exemplary embodiment, the class order acquisition unit 203 acquires class information sorted in damage level order. According to the present exemplary embodiment, since the damage levels indicated by the A-, B-, C-, and D-classes decrease in this order as described above, a list with the order of classes such as S, A, B, C, and D is acquired.

A class combination unit 204 combines the combination target class determined by the combination class determination unit 202 and generates a new class system. The class combination unit 204 acquires the order relation between the classes from the class order acquisition unit 203 and combines the combination target class with its adjacent class. According to the present exemplary embodiment, the class combination unit 204 combines the combination target class with one adjacent class that is with a smaller number of samples than the other adjacent class. For example, with the distribution as illustrated in FIG. 4 according to the present exemplary embodiment, the S-class is a combination target as described above, and one class adjacent to the S-class in the order relation is the A-class, so that the S-class is combined with the A-class. As a result of combining the S- and A-classes into a (S+A)-class, there are four class systems that are the (S+A)-, B-, C-, and D-class systems. A label of the class can be an "S+A" that is different from those of the other classes. The class combination unit 204 stores information about the combination class in association with the class order relation acquired by the class order acquisition unit 203. In some embodiments, the combination target class is combined with one adjacent class that includes more samples than the other adjacent class.

A training unit 205 sequentially acquires training data for damage level classes corresponding to part images, performs training processing, and generates a determiner that determines classes. According to the present exemplary embodiment, the determination of classes is performed by training a multi-class determiner using a multi-layer neural network model by providing a large amount of data on pairs of part images and correct-answer classes. The multi-layer neural network model can be a known multi-layered convolutional neural network (known multi-layered CNN) such as a visual geometry group (VGG) or a residual neural network (res-Net). The models, however, are not limited to convolutional neural network (CNN) models and can be any models that output a class determination result in response to an image that is input. Further, there is a known method for training an output layer so that the output layer outputs a likelihood distribution of each class in training a CNN model as described above. Using a cross-entropy loss as a loss function, this method is commonly used as a multi-class determination method using a CNN, and configurations based on the method are used according to the present exemplary embodiment. In this case, a correct answer is given in training so that, for example, with the S- and A-classes combined together, the combined (S+A)-class is determined as a correct-answer class for the S- or A-class part data. Consequently, from inference using a model generated by the training, a result of classification of the input image into the (S+A)-, B-, C-, or D-class is output. Thus, that configuration allows even training data sets that include a few samples and are not well-balanced to cause no significant error, outputting a result indicating one of the S- and A-classes.

Figure 3:
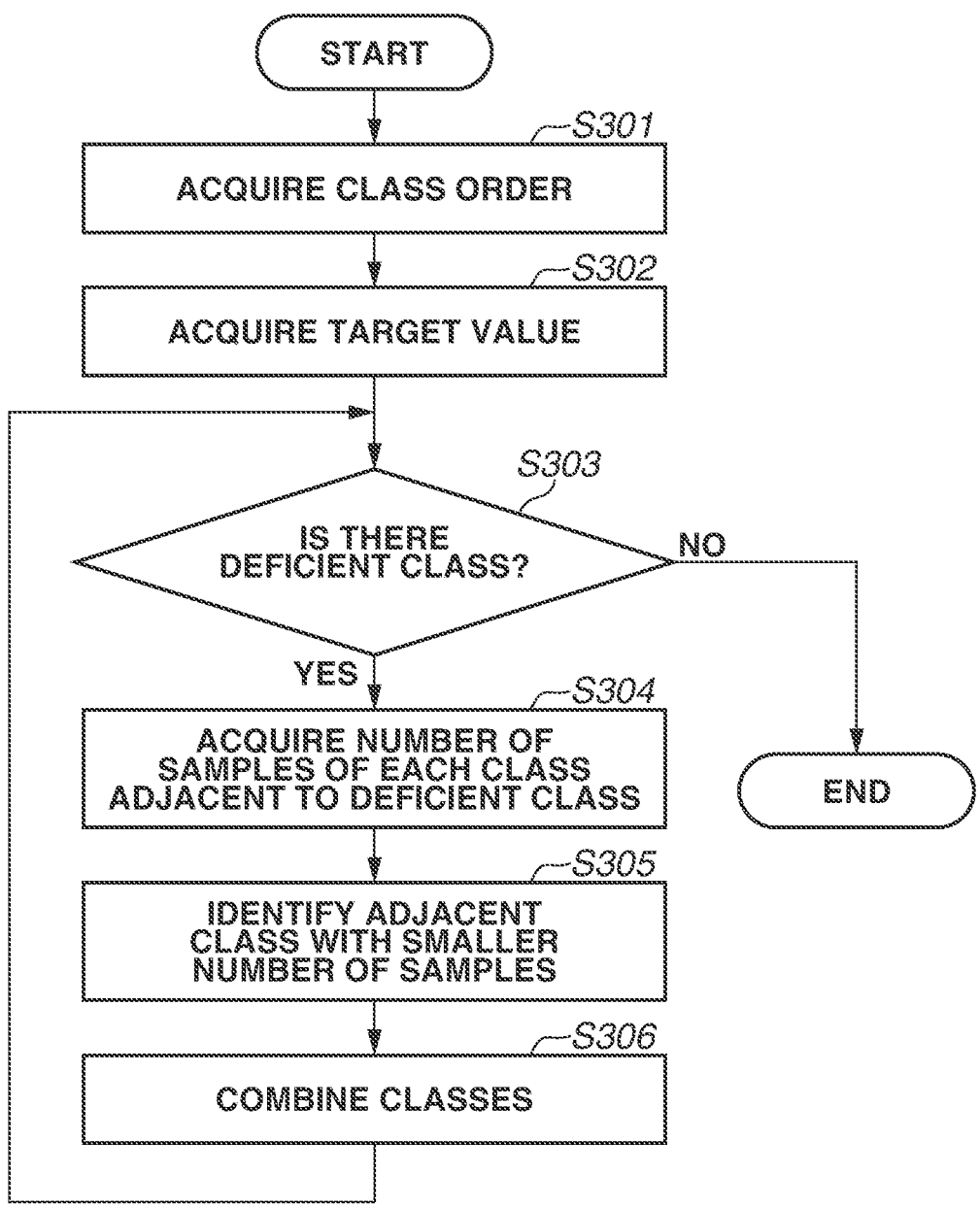
FIG. 3 is a flowchart illustrating a process that is carried out by the class determination apparatus according to one or more aspects of the present disclosure.

Next, a process of combining classes by the class determination apparatus 100 according to the present exemplary embodiment will be described below with reference to a flowchart in FIG. 3. The process in the flowchart is performed in start of the determiner training processing. In some embodiments, the process in the flowchart is started in end of the determiner training processing or the processing of determining classes of objects included in images.

First, in step S301, the class order acquisition unit 203 acquires class order information from the external storage device 104.

In step S302, the combination class determination unit 202 acquires a threshold value for determining a deficient class as a target value. According to the present exemplary embodiment, the threshold value is preset as described above. In some embodiments, the threshold value is set based on user input. In other embodiments, the system automatically determines and sets the threshold value.

In step S303, the data acquisition unit 201 acquires information about the number of images (the number of samples) that are data about each class or at least training data for each class from the external storage device 104. Then, the combination class determination unit 202 determines whether there is a class (hereinafter, "deficient class") with the number of images that is smaller than the threshold value acquired in step S302. If there is a deficient class with the number of images that is smaller than the threshold value (YES in step S303), the processing proceeds to step S304. According to the present exemplary embodiment, a deficient class with the smallest number of images is combined first. If there is no deficient class with the number of images that is smaller than the threshold value (NO in step S303), the class combination is not performed, and the process is ended.

In step S304, the class combination unit 204 refers to the class order information acquired by the class order acquisition unit 203 and acquires the number of images (the number of samples) that are training data for each class adjacent to the deficient class identified in step S303.

In step S305, the class combination unit 204 identifies one of the adjacent classes identified in step S304 with the number of samples that is smaller than the other.

In step S306, the class combination unit 204 combines the deficient class with the adjacent class identified in step S305 as the adjacent class with the number of samples that is smaller than the other, and the class combination unit 204 generates a new combination class. Then, the processing returns to step S303, and the processing of determining whether there is a deficient class among the classes including the combination class is repeated.

According to the present exemplary embodiment, if the processing returns to step S303 and the combination class is a deficient class, the combination processing is performed on one class adjacent to the combination class.

However, a combination class including too many classes may be too unclear to the user even if it is high accurate. Thus, for example, a maximum number of classes that is combined into one combination class may be preset. In this case, if the deficient class is a combination class in step S303, the class is excluded from the combination target depending on the number of classes combined into the combination class in performing the processing.

Further, combining two classes in the above-described process may result in a combination class with the number of samples that is a maximum of about twice the threshold value. In this case, the training may be carried on if the amounts of training data for the other classes are sufficient. In some embodiments, the training is performed after the numbers of samples of all classes are adjusted to about the threshold value. In this case, the number of samples of each class is about the same as the threshold value. Random sampling from the entire combination class can cause images of classes with a small number of samples to be unselected. For the reason, a numerical reduction target can be determined based on the ratio after the combination.

As described above, according to the present exemplary embodiment, a class with the number of training images that is deficient is combined with an adjacent class, which provides a class determiner assisting the user in performing operations without causing the training to end in failure.

A second exemplary embodiment will be described. The example has been described where a class with a small amount of data is combined with an adjacent class of ordered classes according to the first exemplary embodiment. In this case, the user can be prompted to confirm whether to proceed with the combination. However, with text alone indicating the fact that the combination is to be performed, the user may not be able to make a judgment about the permission easily because this is different from an original intention.

According to the second exemplary embodiment, a set of images selected to include an image of a combination class is presented to obtain an agreement from the user.

The hardware configuration of the class determination apparatus 100 according to the present exemplary embodiment is similar to that according to the first exemplary embodiment. Further, FIG. 5 illustrates a functional configuration of the class determination apparatus 100 according to the present exemplary embodiment. Like numbers in FIG. 5 refer to like blocks of the functional configurations in FIG. 2, and redundant descriptions thereof will be omitted.

Specifically, the functional configuration in FIG. 5 is different from that in FIG. 2 in that a confirmation information generation unit 501 and a combination instruction acquisition unit 502 are included. The confirmation information generation unit 501 selects an image of each class to be combined by the class combination unit 204 and generates confirmation information for prompting the user to confirm the selected images. Then, the class determination apparatus 100 performs display control to display the confirmation information on a display. The confirmation information can be displayed in various forms so that the user can judge whether to agree with the combination. Further, the training images included in the combination class can be displayed to receive feedback from the user about whether the user feels strange.

Figure 6A:
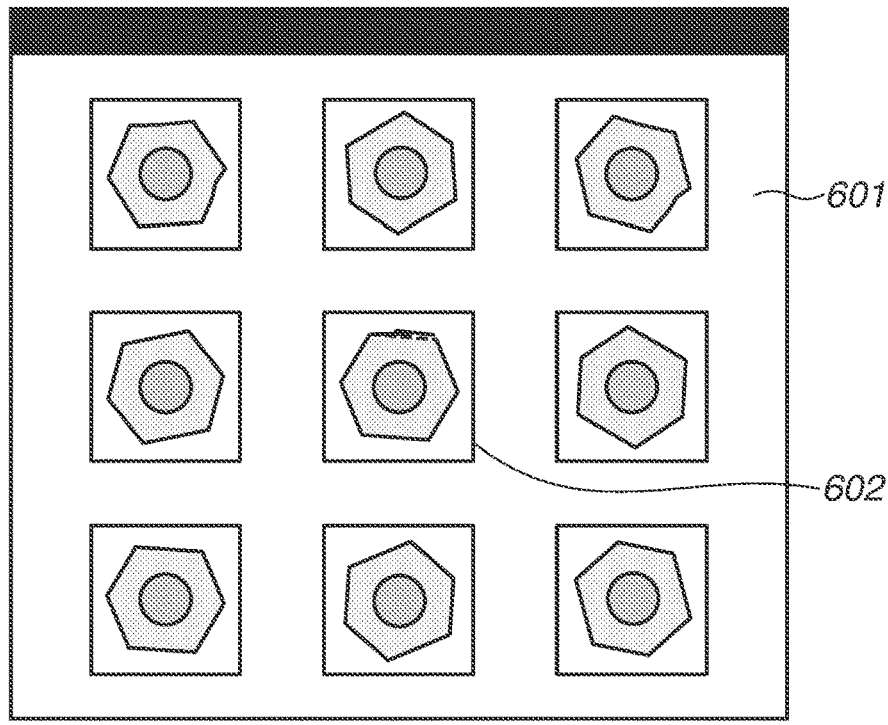
FIGS. 6A and 6B illustrate an example of a display with a mixture of images of combined classes that is presented to a user according to one or more aspects of the present disclosure.
Figure 6B:
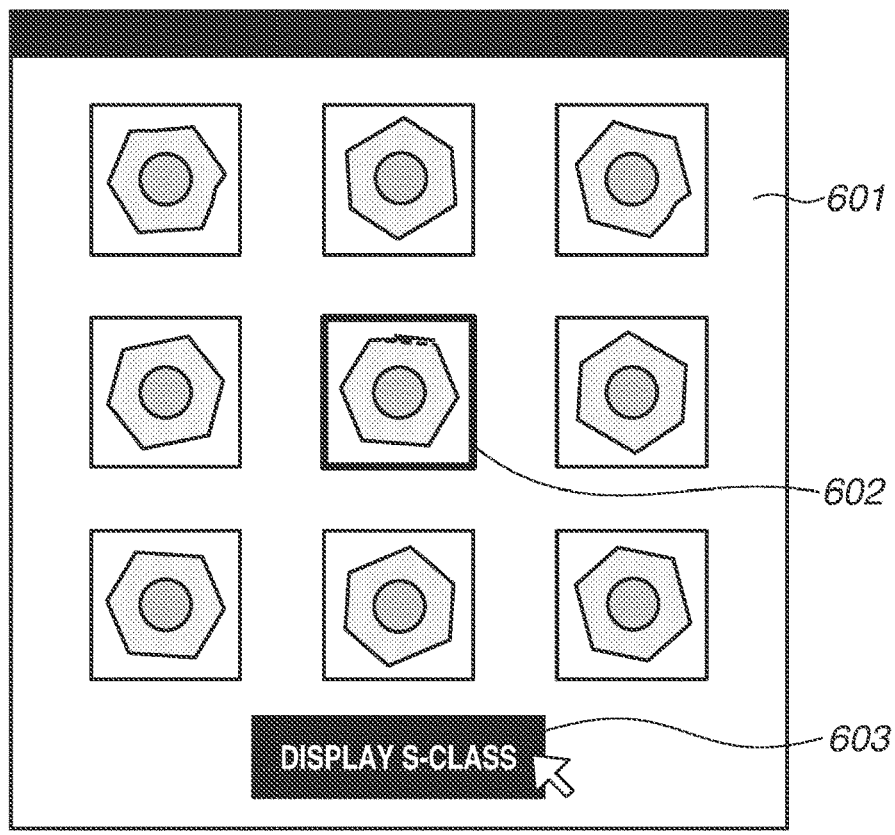

For example, if the S- and A-classes are to be combined together as in the first exemplary embodiment, a mixture of an S-class image with a set of A-class images are displayed and presented as a set of images of the combination class to the user. An example of the display is as illustrated in FIGS. 6A and 6B. FIG. 6A illustrates an example of a display presenting a mixture of images of the combination class. In an example where the S- and A-classes are to be combined together as in the present exemplary embodiment, a presentation example is that an image 602 is an S-class image whereas all the other images are A-class images.

The number of presented images of each class and the arrangement of the images are not limited to those described above, and a random arrangement and a random number that include an image of a combination class can be selected, or a template can be prepared. Any displays on which the user overlooking images of both classes can check whether the images are easily discriminable can be used.

According to the present exemplary embodiment, an arrangement and a number are determined randomly. Thus, an arrangement is determined so that it is difficult to recognize the arranged images as images of the combination class. As described above, training images of a combination class are presented so that the user can overlook the presented images. This prevents an undesirable combination of classes that are easy to discriminate and are not desirable for the user.

The display illustrated in FIG. 6A is prepared to improve user satisfaction with the combination of classes, and a further interface for confirmation can be provided to further improve user satisfaction. For example, a button for highlighting the S-class image, such as a button 603 in FIG. 6B, can be prepared to show the presence of an S-class, in the example illustrated in FIG. 6B, the image 602 is highlighted due to an S-class image. In some embodiments, a function is provided of updating the display by re-selecting an S-class image and re-arranging the images until the user is satisfied if the user suspects that images that are difficult to discriminate between the S- and A-classes are incidentally selected.

After the confirmation information is displayed by the confirmation information generation unit 501, the combination instruction acquisition unit 502 acquires an instruction as to whether to proceed with the combination of the classes from the user. If the combination instruction acquisition unit 502 receives an instruction to proceed with the combination from the user, the class combination unit 204 combines the classes, and the training is performed as in the first exemplary embodiment.

This is expected to produce a specific advantage of the exemplary embodiment that the user can proceed with the training with satisfaction with the combination of the classes compared to a case where text alone indicating the fact of the combination is presented.

A third exemplary embodiment will be described. According to the above-described exemplary embodiments, the configurations prevent a situation where the number of samples of a particular class is significantly small as a result of combining classes. However, inference using a model generated through training results in output of a combination class, with the classification results based on a granularity level different from one that is originally intended by the user. As described above, the information indicating that a class is classified into one of the classes combined into the combination class can be used in a form of output to associate the combination class combined by the class combination unit 204 and the original classes. However, the input image class still includes a plurality of classes, which has a different granularity level from the intended one even if the class includes a correct class. A display on which the user can determine which class a combination class as an output result belongs to will be described below.

A hardware configuration of the class determination apparatus 100 according to the present exemplary embodiment is similar to that according to the first exemplary embodiment. Further, FIG. 7 illustrates a functional configuration of the class determination apparatus 100 according to the present exemplary embodiment. Like numbers according to the above-described exemplary embodiments refer to like blocks of the functional configurations according to the present exemplary embodiment, and redundant descriptions thereof will be omitted.

An inference data acquisition unit 701 acquires a part image (705) that is a class estimation target. An inference unit 702 loads a classification model generated by the training unit 205 and infers a class on the input image. As described above in the exemplary embodiments, the class classification model generated by the training unit 205 is stored in an external storage device (703). The generated model is a model that classifies input images into classes after the combination as described above. Specifically, if the S- and A-classes are combined into the (S+A)-class and the training is performed, an inference result by the inference unit 702 based on the model outputs information indicating which one of the (S+B-, C-, and D-classes is the likely class of the input image. An output unit 704 offers the class inferred by the inference unit 702 to the user.

An output example of a result of a class determination process according to the present exemplary embodiment will be described.

Figure 8:
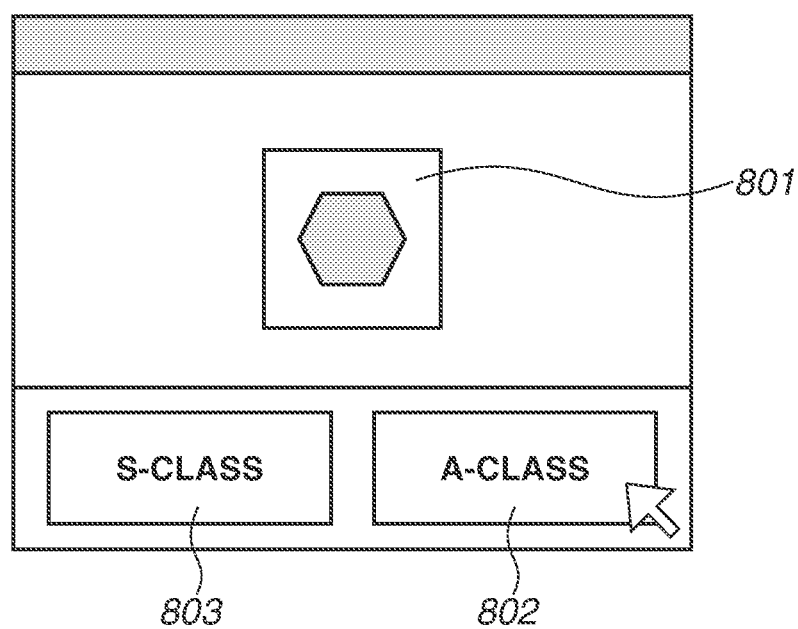
FIG. 8 illustrates an example of a display on which a user can select a combined class in a case where an inference result is a combination class according to one or more aspects of the present disclosure.

FIG. 8 is a diagram illustrating a display example of a result that the input part image is classified into the combination class "(S+A)-class" according to the present exemplary embodiment. FIG. 8 illustrates an image 801 as the input part image, and buttons 802 and 803 for specifying the original classes of the combination class. While two classes that are the S- and A-classes are combined together according to the present exemplary embodiment, two or more classes can be combined together. In that case, buttons for the classes that are combined together are offered in class order.

The display prompts the user to confirm the part with the inference result that is the (S+A) combination class. At the same time, the user can specify which one of the classes of the combination class the bolt image belongs to based on a determination by the user. This is expected to produce a specific advantage of the exemplary embodiment that classification results based on a granularity level that is originally intended by the user are retained with the accuracy of classification using the combination class maintained.

Figure 9:
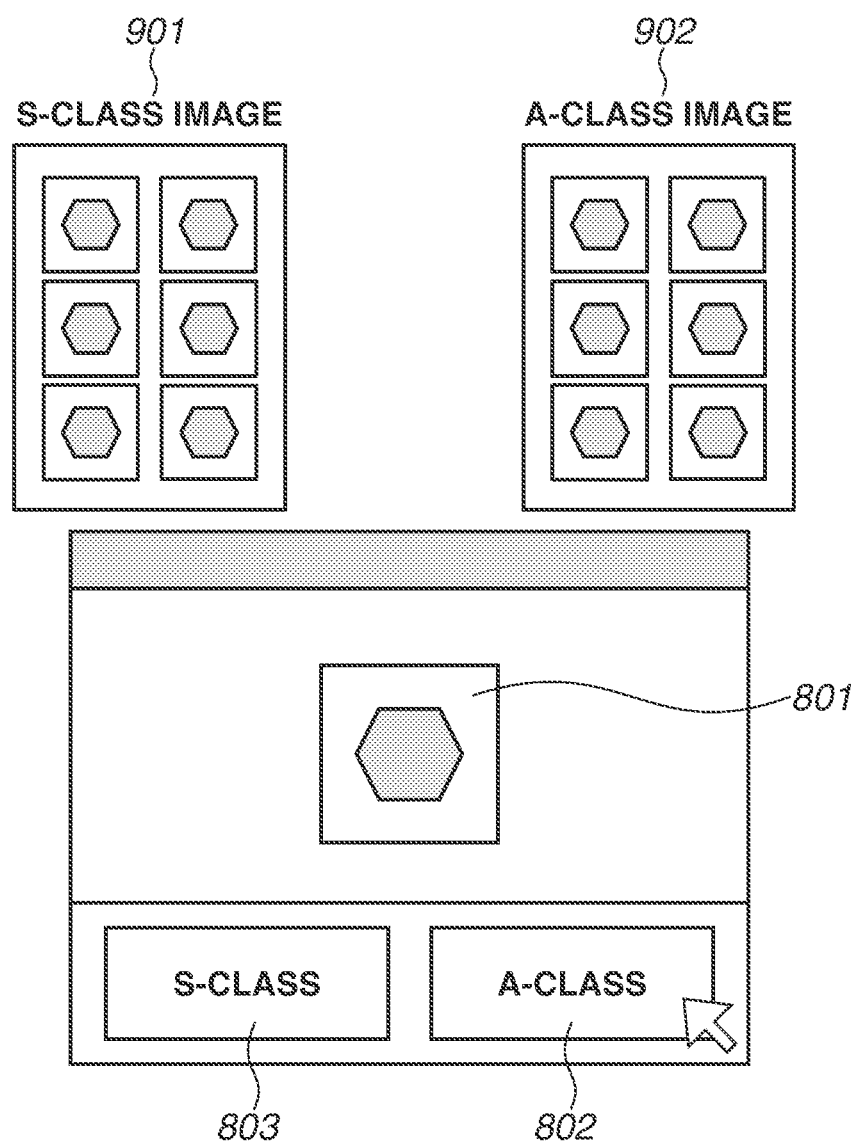
FIG. 9 illustrates an example of a display for selecting a combination class on which training images for each class of the combination class are also presented according to one or more aspects of the present disclosure.

Further, since the combination class is a combination of adjacent classes, it is often difficult to determine which one of the classes of the combination class a determination target image belongs to through visual inspection of the determination target image alone. Especially unclear determination criteria lead to considerable fluctuations from person to person. In that case, as illustrated in FIG. 9, image samples of the classes that are combined together can also be presented in confirming the combination class. According to the present exemplary embodiment, for the combination of the S+A classes as the combination class, an S-class sample (901) and an A-class sample (902) are displayed together. If two or more classes are combined together, samples of all the combined classes can be presented. Further, the number and arrangement of display samples and how the samples are presented are not limited. Any display forms can be used that assist in the determination of which class of a combination class a target belongs to.

According to a fourth exemplary embodiment, the likely class among the combined classes can be displayed as an initial value. The inference unit 702 also outputs a likelihood of each class. While the multi-class determiner is trained using the cross entropy loss as described above according to the present exemplary embodiment, information corresponding to a likelihood of each class as an output can be used.

Figure 10:
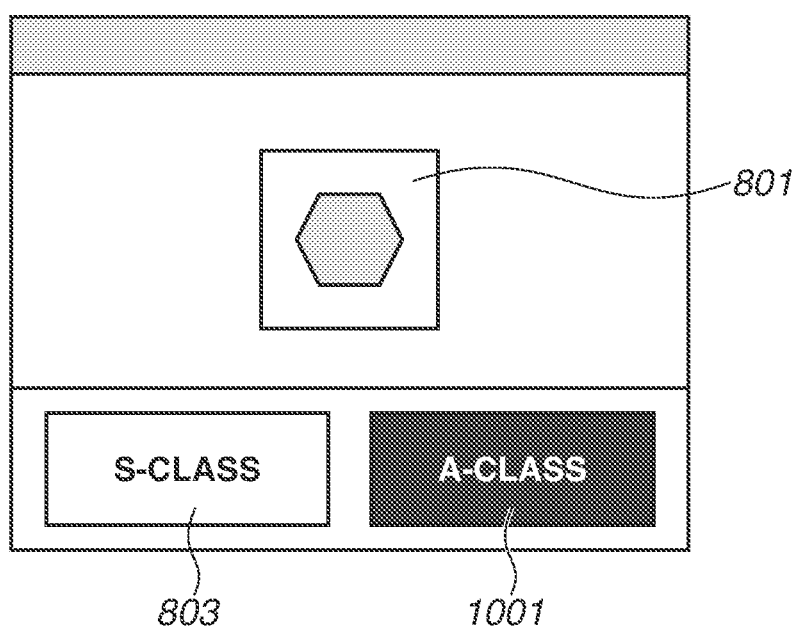
FIGS. 10A and 10B are diagrams illustrating an example of presenting a likelihood of an adjacent class of a combination class and setting an initial value based on the likelihood in a case where an inference result is the combination class according to one or more aspects of the present disclosure.

While the examples using the damage levels S to D are described above in the exemplary embodiments, for convenience of description, a case where there is an SS-class indicating a more severe damage level than the S-class will be described. A distribution of output likelihoods of the SS- and B-classes adjacent to the (S+A) combination class is as illustrated in FIG. 10B, and the likelihood of the B-class is higher than the likelihood of the SS-class. According to the present exemplary embodiment, the classes are ordered, and the class order information before the combination is acquired by the class order acquisition unit 203, so that the A-class close to the B-class is presented to the user with it selected as an initial value. A state 1001 in FIG. 10A indicates that the A-class is being selected.

If the user makes a class determination on a large number of images, confirmation on an initial value that is presented raises the efficiency of processing. Further, information presented as a basis for difficult determination of a combination class is expected to reduce the time during which the user wavers in making a determination.

According to a fifth exemplary embodiment, with the boundary of a class that is not to be combined predetermined (since it is important to discriminate the boundary of the class, the boundary will be referred to as "important class boundary" hereinafter), setting to prevent combination at the boundary is made.

For example, in the damage level determination of parts of bridges and tunnels as described above in the exemplary embodiments, a boundary that is a repair determination target may be set as an important class boundary. Further, to minimize high-cost field operations, a boundary as a target of determining whether re-investigation and visual check are to be made can be set. Further, determination targets are not limited to parts and can be, for example, wall surfaces and columns of buildings or incidental components of lighting facilities in damage level determination. Other domain images are also applicable. For example, a class indicating a development level of a disease among various inspection images in medical fields can be determined, and a boundary that is a target of determining whether re-inspection is to be made can be set as an important class boundary.

Figure 11:
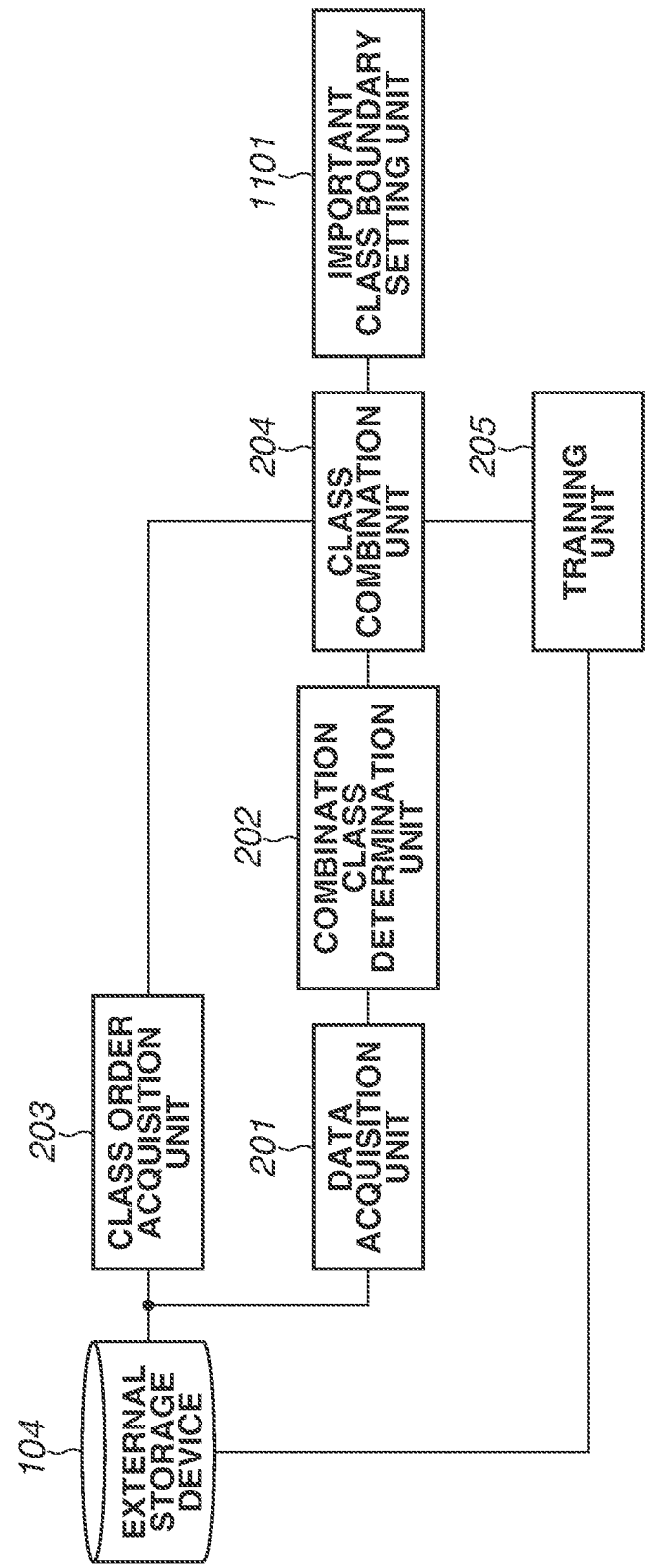
FIG. 11 is a block diagram illustrating a configuration through which a user can set an important class boundary according to one or more aspects of the present disclosure.

To set an important boundary, an important class boundary setting unit 1101 is provided as in a configuration illustrated in FIG. 11 to acquire an important class boundary from the user. The class combination unit 204 performs processing to prevent combination of a class at the important class boundary.

A process with an important class boundary set will be described with reference to a flowchart in FIG. 12. Steps in FIG. 12 that correspond to steps in FIG. 3 are given the same reference numeral, and redundant descriptions thereof will be omitted.

Figure 12:
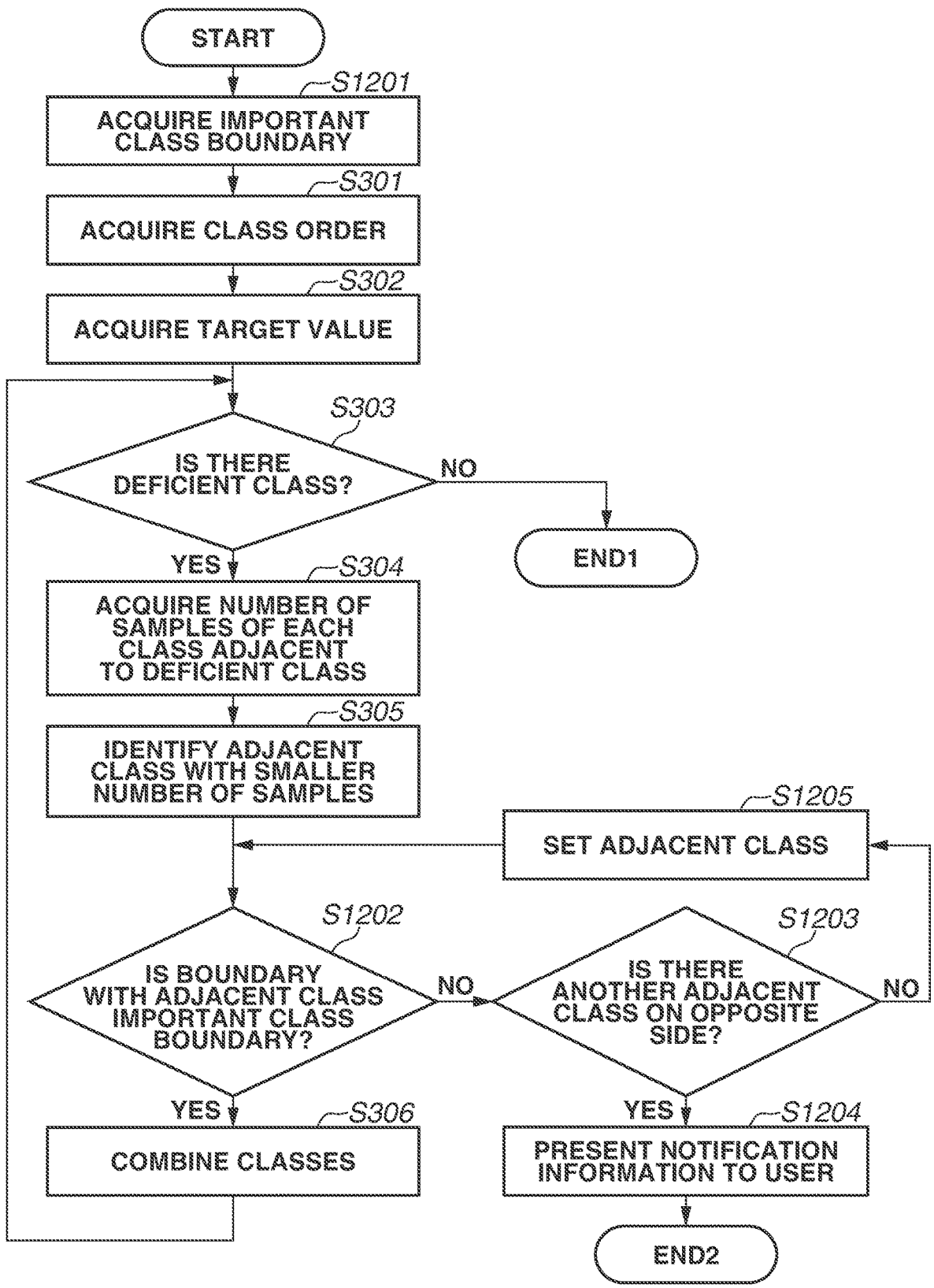
FIG. 12 is a flowchart illustrating a process with an important class boundary set according to one or more aspects of the present disclosure.

In FIG. 12, first, in step S1201, the class determination apparatus 100 acquires the important class boundary information set by the user via the important class boundary setting unit 1101. Subsequent steps S301 to S305 are similar to those in FIG. 3.

In step S1202, after identifying an adjacent class that is a combination target in step S305, the class combination unit 204 determines whether the boundary with the identified adjacent class is an important class boundary.

If the boundary is not an important class boundary (NO in step S1202), the processing proceeds to step S306. In step S306, the classes are combined together. On the other hand, if the boundary is an important class boundary (YES in step S1202), the processing proceeds to step S1203.

In step S1203, the class determination apparatus 100 checks whether there is another adjacent class on the opposite side to the important boundary determined in step S1202. If there is another adjacent class (NO in step S1203), the processing proceeds to step S1205. In step S1205, the class is set again as an adjacent class that is a combination target, and the processing proceeds to step S1202. On the other hand, if there is no adjacent class on the opposite side to the important boundary (YES in step S1203), the processing proceeds to step S1204.

In step S1204, the class determination apparatus 100 presents information indicating that combination is difficult to the user. For example, since the combination cannot be performed, the message "the training may fail due to unbalanced numbers of classes" is presented. Further, the class determination apparatus 100 can present the inquiry "Do you want to continue the training?" to the user and can stop the training depending on the response from the user to the inquiry.

According to the present exemplary embodiment, the above-described configuration limits combination of classes across an important class boundary that is a target of determining whether repair is to be made, which allows the training of a determiner capable of easily determining whether repair is to be made and the class determination, in addition to the above-described advantages.

A sixth exemplary embodiment will be described. In the examples according to the above-described exemplary embodiments, the user uniquely assigns a class to each piece of training data as in the table in FIG. 4. In reality, however, if labels with an order relation, such as damage levels of parts, are added, boundaries between the labels are often unclear, and determination results often vary from user to user. To deal with cases where the user cannot make a determination and determination results are unclear, a plurality of classes may be added to parts in the class combination processing described above.

Figure 13:
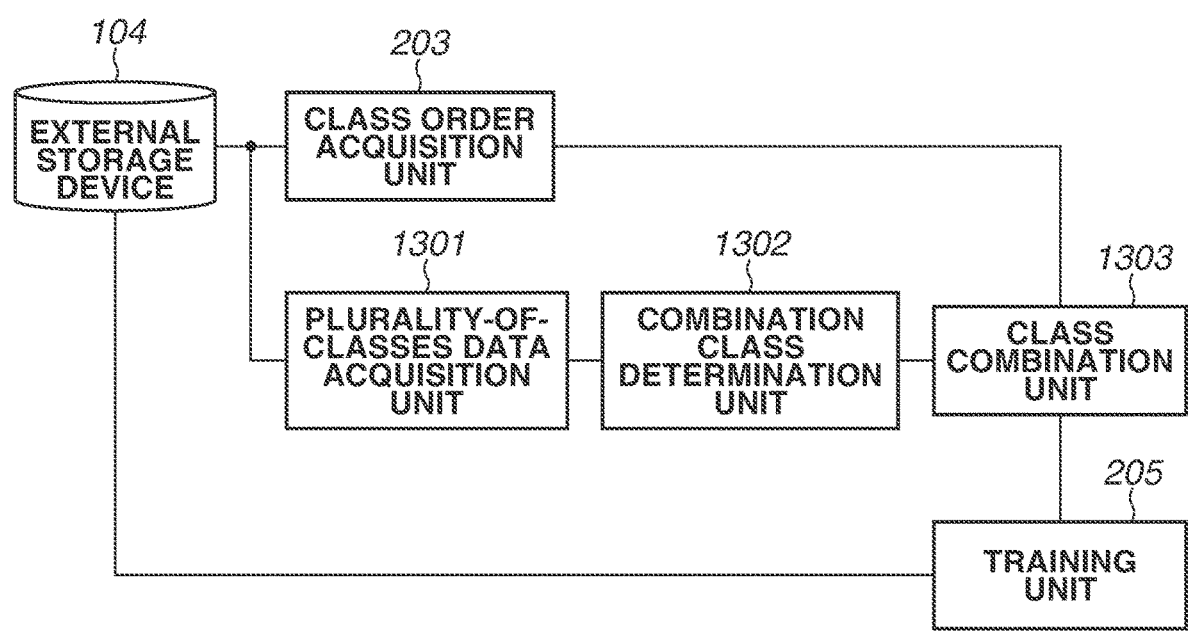
FIG. 13 is a block diagram illustrating a configuration in a case where classes each indicating that it is difficult to determine which one of two adjacent classes a target corresponds to can be added to training data according to one or more aspects of the present disclosure.

A hardware configuration of the class determination apparatus 100 according to the present exemplary embodiment is similar to that according to the first exemplary embodiment. Further, FIG. 13 illustrates a functional configuration of the class determination apparatus 100 according to the present exemplary embodiment. Like numbers in FIG. 2 refer to like blocks of the functional configurations in FIG. 13, and redundant descriptions thereof will be omitted.

In FIG. 13, a plurality-of-classes data acquisition unit 1301 acquires distribution information about all damage levels of training data. The plurality-of-classes data acquisition unit 1301 acquires a damage level distribution as illustrated in FIG. 14, for example. FIG. 14 illustrates an example of a table showing a distribution of the numbers of pieces of data, the distribution of which includes data to which a plurality of adjacent damage level classes is added. That example illustrates the numbers of pieces of data to which a single class such as the S-, A-, B-, C-, or D-class is added and the numbers of pieces of data (1402 to 1405) to which a plurality of classes is added. Each of the numbers of pieces of data to which a plurality of classes is added is sandwiched between the numbers of pieces of data to which the single classes corresponding to the plurality of classes are added, the plurality of classes of which is added since the user wavers in determination.

A combination class determination unit 1302 determines a class to be combined based on the class information about the training images including the plurality of classes acquired by the plurality-of-classes data acquisition unit 1301. In the present exemplary embodiment, images through successful determination by the user are used as training images. Specifically, images of the S-, A-, C-, and D-classes in FIG. 14 are used in training. As the S-class is a deficient class, the S-class is determined as a combination target class.

A class combination unit 1303 combines the deficient class with the adjacent class. The present exemplary embodiment is different from the first exemplary embodiment in that images of an adjacent class that corresponds to a boundary, such as images 1402 to 1405, are combined first with the deficient class. For example, with the S-class as a combination target, the images 1402 of the adjacent (S, A)-class are combined with the S-class. As a result, the number of pieces of data for the S-class is 5+35=40, and the data can be used in training.

The processing is performed as described above so that if there is a deficient class, use of unclear data that can also be determined as the deficient class makes it possible to perform training without a decrease in accuracy. While methods for adding a plurality of classes are not particularly limited, for example, the user can input classes on a display as illustrated in FIGS. 15A and 15B.

Figure 15A:
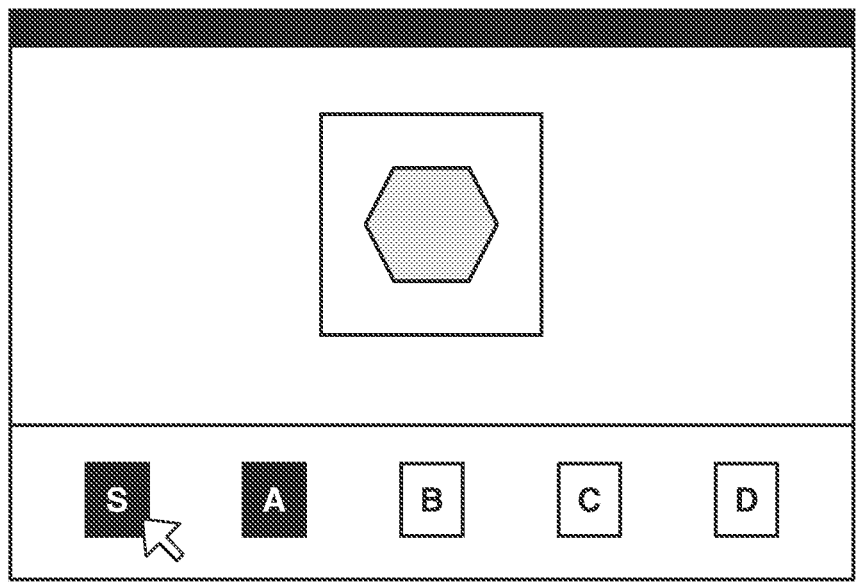
FIGS. 15A and 15B are diagrams illustrating an example of a display on which a user selects two adjacent classes and sets the selected classes according to one or more aspects of the present disclosure.
Figure 15B:
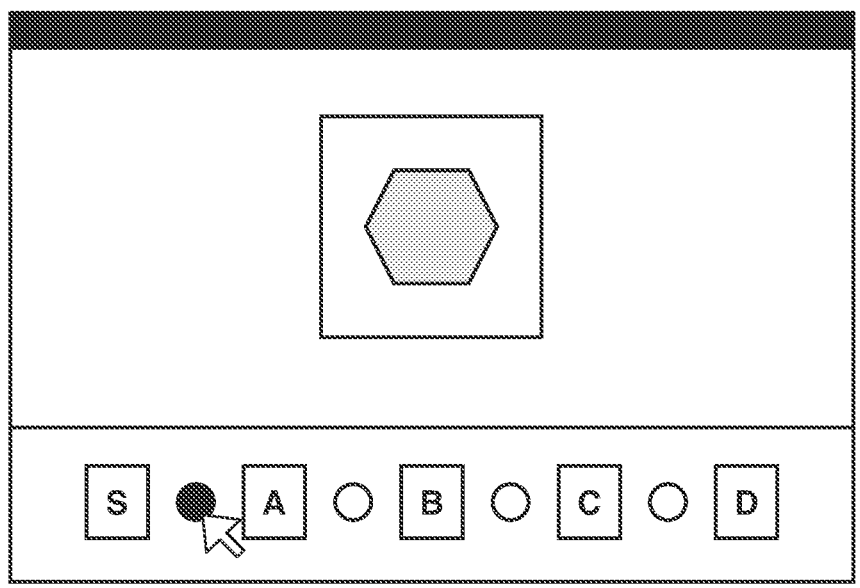

FIGS. 15A and 15B illustrate an example of an input screen on which a plurality of classes is selectable if the user wavers in determination which one of the S- and A-classes the image corresponds to. FIG. 15A illustrates an input example where a maximum of two adjacent selection buttons are selectable. FIG. 15B illustrates an example where a button between two classes can be selected when the user wavers in determination which of the two classes the image corresponds to. In either cases where the user inputs as illustrated in FIG. 15A or 15B, the plurality of classes "S, A" is added.

The use of training data with a plurality of classes added is not limited to that described above. For example, when a plurality of classes is added to data that is difficult for the user to determine, the pieces of data about the classes can collectively be included in an adjacent class. For example, data can be combined based on rules, e.g., data to which both S- and A-labels are added is combined into the S-class whereas data to which both A- and B-labels are added is combined into the A-class.

According to the present exemplary embodiment, the above-described configuration allows a plurality of classes to be added, and when the plurality of classes is added, the classes can be combined.

Other Exemplary Embodiments

The present disclosure is also applicable by the following process. Specifically, a program for carrying out one or more functions of the above-described exemplary embodiments is fed to a system or an apparatus via a network or a storage medium, and one or more processors of a computer of the system or the apparatus reads the program and runs the read program. Further, the present disclosure is also applicable with a circuit (e.g., ASIC) that carries out one or more functions. Further, present disclosure is also applicable with a system consisting of a plurality of devices (e.g., a host computes, an interface device, an image capturing unit, a web application).

According to the exemplary embodiments of the present disclosure, erroneous classification results are reduced even if there is a class for which sufficient training images are not acquired.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (AMC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099454, filed Jun. 15, 2021, which is hereby incorporated by reference herein in its entirety.

What is claimed is:

1. An information processing apparatus comprising:
an acquisition unit configured to acquire the number of training images including an object belonging to one of a plurality of classes having an order relation, the acquisition unit acquiring the number of training images for each of the plurality of classes;
a first determination unit configured to determine, as a combination target class to be combined, a class with the number of training images that is smaller than a threshold value among the plurality of classes;
a combination unit configured to combine the combination target class with an adjacent class in the order relation; and
a second determination unit configured to determine a class of an object included in an input image using a determiner trained using the training image based on a combination class combined by the combination unit.

2. The information processing apparatus according to claim 1, wherein the threshold value is set based on input from a user.

3. The information processing apparatus according to claim 2, wherein a specific class among the plurality of classes is not determined as the combination target class even in a case where the number of training images of the specific class is smaller than the threshold value.

4. The information processing apparatus according to claim 3,
wherein each of the plurality of classes indicates a damage level of a part of a structure; and
wherein the specific class is a class of a boundary of determining whether repair is to be performed.

5. The information processing apparatus according to claim 1, further comprising a training unit configured to train the determiner using the training image to determine which class from the combination class combined by the combination unit and the plurality of classes that is not combined by the combination unit the object included in the input image belongs to.

6. The information processing apparatus according to claim 1, wherein in a case where two classes are adjacent in the order relation to the combination target class determined by the first determination unit, the combination unit combines one of the two classes adjacent in the order relation to the combination target class with the combination target class, the one having a smaller number of training images than the other.

7. The information processing apparatus according to claim 1, further comprising a reception unit configured to receive a user instruction to combine the combination target class with an adjacent class in the order relation,
wherein in response to when the reception unit receives the instruction, the combination unit combines the combination target class with the adjacent class in the order relation.

8. The information processing apparatus according to claim 1, further comprising a display control unit configured to display the training image for the combination target class and the training image for the adjacent class in the order relation.

9. The information processing apparatus according to claim 1, further comprising an identification unit configured to identify, in response to when the second determination unit determines that the object included in the input image belongs to the combination class combined by the combination unit, whether the object included in the input image belongs to the combination target class or to the adjacent class in the order relation based on a user operation.

10. The information processing apparatus according to claim 1, wherein each of the plurality of classes indicates an age, a development level of a disease, or a damage level of a part of a structure.

11. A class determination method comprising:
determining the number of training images including an object belonging to one of a plurality of classes having an order relation, the number of training images being determined for each of the plurality of classes;

determining, as a combination target class to be combined, a class with the number of training images that is smaller than a threshold value among the plurality of classes;

combining the combination target class with an adjacent class in the order relation; and determining a class of an object included in an image using a determiner trained using the training image based on a combination class combined by the combination unit.

12. A non-transitory computer-readable recording medium that stores a program for causing a computer to execute an information processing method, the method comprising:

acquiring the number of training images including an object belonging to one of a plurality of classes having an order relation, and acquiring the number of training images for each of the plurality of classes;

determining, as a combination target class to be combined, a class with the number of training images that is smaller than a threshold value among the plurality of classes;

combining the combination target class with an adjacent class in the order relation; and determining a class of an object included in an input image using a determiner trained using the training image based on a combination class combined.

* * * * *